Feb. 6, 1968     E. R. KENDALL     3,368,065
AIRCRAFT INSTRUMENTS
Filed May 14, 1964                2 Sheets-Sheet 1

INVENTOR:
ERIC RAYMOND KENDALL
ATTORNEYS:
Moore, Hall & Pollock

United States Patent Office 3,368,065
Patented Feb. 6, 1968

3,368,065
AIRCRAFT INSTRUMENTS
Eric Raymond Kendall, Cheltenham, England, assignor to S. Smith & Sons (England) Limited, London, England, a British company
Filed May 14, 1964, Ser. No. 367,466
Claims priority, application Great Britain, May 16, 1963, 19,399/63
21 Claims. (Cl. 235—150.22)

ABSTRACT OF THE DISCLOSURE

An aircraft take-off monitor has an index driven across a four-region display-area in accordance with progress along the runway. The index, by the region it occupies and its movement relative to the other regions, indicates the current situation and trend in take-off safety. The index has a fixed path intersected by movable cursors defining the four regions, or has a path variable in two coordinates relative to invariable regions. With the fixed index-path, a second index indicates the extra distance required to achieve a fixed velocity-increment.

---

This invention relates to aircraft instruments.

The invention is particularly concerned with aircraft instruments for use during the ground-run phase of take-off of an aircraft. During the ground-run phase the pilot of the aircraft is required to pay particular attention to the aircraft performance so that he may assess whether the take-off is proceeding normally. In particular the pilot will attempt to assess the present situation and likely future situation as regards safety, and it is an object of the present invention to provide an aircraft instrument that may be used to assist him in making such assessment.

According to one aspect of the present invention an aircraft instrument for use during the ground-run phase of take-off of an aircraft comprises means responsive to movement of the aircraft during the ground-run to provide signals which are dependent upon distance travelled and forward velocity of the aircraft. An indicator is provided which is responsive to the signals to provide a display for assisting in assessing the present situation and a likely future situation during the ground-run. The indicator includes means dividing the display into a plurality of distinct regions representative of different predetermined situations potentially applicable to the ground-run. An index is mounted in the display to lie selectively in one or other of said regions, the particular region in which the index lies being dependent upon the position relative to one another of the display-dividing means and the index. Means are also provided for varying the relative position of the display-dividing means and the index in accordance with said signals so that the index lies in that one of said regions which is appropriate to said present situation, and so that the trend of movement relative one to the other of the display-dividing means and the index provides an indication of the likely future situation.

The index may be mounted for movement along a predetermined path from a stationary datum position in the display, and in this case it may be arranged that the displacement of the index from said datum position along said path is dependent upon the distance travelled by the aircraft. The display-dividing means in this case may be one or more movable cursors which extend across the display to intersect said path.

The display-dividing means, rather than being movable, may be stationary within the display. In this case the means for varying the relative position of the display-dividing means and said index may be arranged such that the direction in which said index is moved relative to said display-dividing means is dependent upon said signals. Furthermore, the said regions may be different regions of a face-plate that is visible through a viewing aperture of the indicator, and in these circumstances the means for varying the relative position of the display-dividing means and said index may be arranged to position said index across the face-plate in accordance with the distance travelled by the aircraft.

The different regions into which the display is divided may be representative of different situations each involving more than one factor. For example, where there are four regions representing different situations each situation may involve one factor concerned with whether or not it is safe to abandon the take-off, and another factor concerned with whether or not it is safe to continue with the take-off in the event of the occurrence of a specific emergency (such as partial loss of forward thrust). The four situations in this example may therefore be expressed briefly as:

(i) Safe to abandon, but not safe to continue in the event of occurrence of the emergency condition;
(ii) Safe to abandon, and safe to continue in the event of occurrence of the emergency condition;
(iii) Not safe to abandon, but safe to continue in the event of occurrence of the emergency condition; and
(iv) Not safe to abandon and not safe to continue in the event of occurrence of the emergency condition.

According to another aspect of the present invention an aircraft instrument for use during the ground-run phase of take-off of an aircraft comprises means which is adapted, on the one hand, to provide during the ground-run a signal dependent upon the distance travelled along the ground by the aircraft, and, on the other hand, to compute, and to provide a signal dependent upon, a prediction of the distance that the aircraft will need to travel during the ground-run in order to attain a predetermined change in velocity. An indicator is provided which has two indices that are movable with respect to one another along close and substantially parallel paths, said indicator being arranged to be responsive to the two signals provided by said means to position the two indices along their paths of movement in accordance respectively with the distance travelled and said prediction of the distance which needs to be travelled. The arrangement is such that the difference between the distances which are respectively indicated by the two indices may be readily appreciated by the aircraft pilot during the ground-run phase by reference to the positions relative to one another of the two indices along their paths of movement.

Two aircraft instruments in accordance with the present invention will now be described, by way of example, with reference to the accompanying drawings in which—

Figure 1:
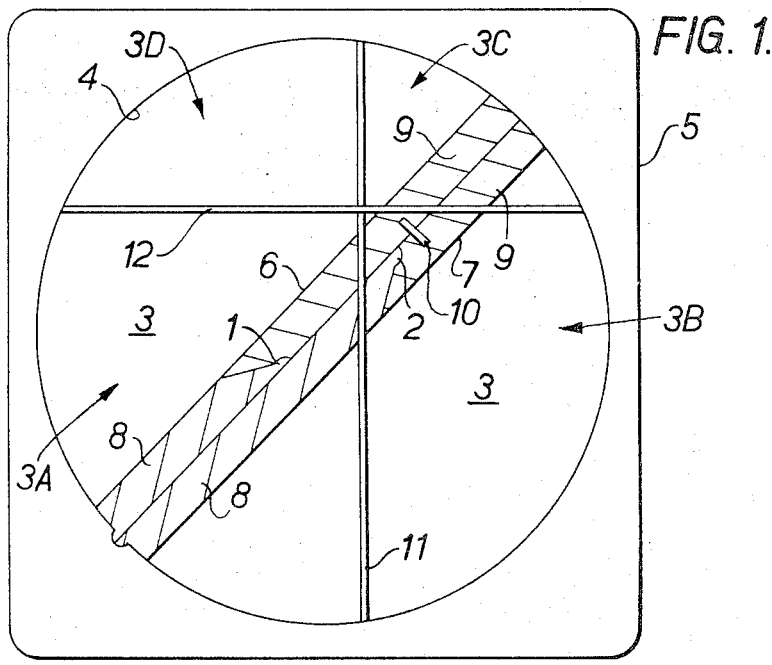
FIGURE 1 is a front elevation of an indicator forming part of a first of the two aircraft instruments.

Each instrument to be described is for use in a multi-engined aircraft and comprises electrical computing equipment for providing electric signals in accordance with progress of the aircraft throughout the ground-run phase of take-off, and an indicator for providing a display in accordance with the signals provided by the computing equipment. The computing equipment in each case is similar to the computing equipment of the ground-run predictor that is described in U.S. Patent No. 3,159,728 of F. D. James and D. A. Rush, issued Dec. 1, 1964. The ground-run predictor described with reference to FIGURE 2 of this earlier patent includes an inductive pick-off device which is arranged to supply an electric pulse for each revolution of a wheel of the aircraft, and computing equipment which computes in accordance with the pulses supplied by the pick-off device the appropriate values of forward velocity V of the aircraft and distance travelled S from the beginning of the ground-run. The computing equipment of U.S. Patent No. 3,159,738 also computes the margin M between the "critical" distance (that is to say the distance, measured from the beginning of the ground-run, from which take-off can be safely abandoned) and the distance (also measured from the beginning of the ground-run) at which it is predicted that the scheduled critical velocity will be reached. In each of the instruments to be described the computing equipment computes the velocity V and the distance S but does not compute the margin M.

With the first instrument to be described with reference to FIGURES 1 and 2 of the accompanying drawings the computing equipment instead of computing the margin M, computes three distances $S_I$, $S_V$, and $S_H$, each measured from the beginning of the ground-run. The distance $S_I$ is a prediction of the increased distance that will need to be travelled in order to attain an increase $v$, for example of ten knots, in aircraft velocity V. The computation of the value of this increased distance $S_I$ is based on the equation:

$$S_I = S + h(V_I^2 - V^2)/2a \qquad (1)$$

but is actually carried out according to the simplified form:

$$S_I = S + Hv(2V + v)/2a \qquad (2)$$

where:

$V_I$ is the increased velocity so that $V_I$ equals $(V+v)$,
$a$ is the forward acceleration of the aircraft,
$h$ is a modifying function taking into account among other things the increase in aircraft drag as velocity V increases, the specific form of this function being discussed later in the present specification, and
$H$ is an approximation to the function $h$.

The distance $S_V$ is a prediction, dependent upon the velocity V, of the minimum distance, measured from the beginning of the ground-run, that needs already to have been travelled before in the event of a specific emergency the take-off can be continued with safety. The specific emergency provided for in the present case is failure of an engine of the aircraft, and the computation of the appropriate value of the distance $S_V$ is carried out according to the equation:

$$S_V = 2S - S_L + H(V_L^2 - V^2)/2(a-p) \qquad (3)$$

where:

$S_L$ and $V_L$ are respectively the predetermined values of distance S and velocity V at which lift-off is scheduled to occur, and
$p$ is the decrease in the current forward acceleration that will result from the emergency, that is to say, will result from failure of an engine, the value of $p$ being equal to:

$$g(T_V + D_V)/W$$

$g$ being the acceleration due to gravity,
$T_V$ and $D_V$, which are both functions of the velocity V, being respectively the decrease in forward thrust and the increase in drag incurred by failure of an engine, and
$W$ being the laden weight of the aircraft.

Equation 3 is derived from the following considerations. With all engines effective and at forward velocity V and distance S from the beginning of the ground-run, the distance, measured from the beginning of the ground-run, that will need to be travelled to attain the scheduled lift-off velocity $V_L$ can be predicted as:

$$S + h(V_L^2 - V^2)/2a$$

When an engine fails the forward acceleration is reduced to $(a-p)$, and so in the event of failure of an engine at forward velocity V and distance S the predicted total distance to attain the scheduled lift-off velocity $V_L$ is increased to:

$$S + h(V_L^2 - V^2)/2(a-p)$$

If this exceeds the scheduled lift-off distance $S_L$, the take-off cannot be continued safely in the event of failure of an engine. The difference between the predicted distance and the distance $S_L$ can be regarded as being a deficiency in the distance travelled S, and a measure of this deficiency can be provided as the amount by which the distance traveled S is less than the minimum value $S_V$ from which take-off could be safely continued. Thus:

$$S_V - S = [S + h(V_L^2 - V^2)/2(a-p)] - S_L$$

which upon rearrangement and replacement of the ideal modifying function $h$ by the approximation $H$, provides Equation 3.

The third distance predicted, the distance $S_H$, is a prediction dependent upon the velocity V of the maximum distance, measured from the beginning of the ground-run, from which take-off can be safely abandoned. The computation of the value of the distance $S_H$ is carried out according to the equation:

$$S_H = S_E - S_B \qquad (4)$$

where:

$S_E$ is the maximum distance measured from the beginning of the ground-run that the aircraft can travel along the runway, and
$S_B$ is the distance which is required to bring the aircraft to a halt, this being an integral function of the velocity V, the function in the present case being:

$$\int_V^0 [V/g\mu(1-L/W)]dV$$

$\mu$ being the appropriate coefficient of friction between the aircraft wheels and the runway, and L the lift applicable, both $\mu$ and L being themselves functions of the velocity V.

The computing equipment supplies output digital representations of the computed values of the aircraft velocity V, the distance travelled S, and the predicted distances $S_I$, $S_V$, and $S_H$. These five digital representations are converted to analogue form by respective digital-to-analogue converters, the analogue representation of velocity V being supplied (as in the case of the arrangement described in U.S. Patent No. 3,159,738) to a velocity indicator. The analogue representations of distance travelled S and predicted distances $S_I$, $S_V$, and $S_H$, on the other hand are supplied to the indicator shown in FIGURE 1.

Referring to FIGURE 1, the indicator has two indices 1 and 2 which are both visible against a face-plate 3 through an aperture 4 of the indicator-casing 5. The indices 1 and 2 are formed on two tapes 6 and 7 respectively which lie side by side and extend diagonally (at an angle of forty-five degrees to the vertical) across the face-plate 3, each index 1 and 2 being provided by a wedge-shaped end portion of a distinctively colored section 8 of the length of the relevant tape 6 or 7. The distinction in color between the section 8 and the remaining section 9 of each tape 6 and 7 is indicated in the drawing by cross-hatching.

Each tape 6 and 7 is movable lengthwise and independently of the other, the sections 8 and 9 of the two tapes 6 and 7 being of sufficient extent that either may occupy substantially the whole of the length which is visible through the aperture 4. The indices 1 and 2 may therefore be positioned with respect to the face-plate 3 substantially anywhere along the parallel paths of movement of the tapes 6 and 7, the extent of the section 8 of each tape 6 and 7 which is visible through the aperture 4 providing a measure of the displacement of the relevant index 1 or 2, which can be readily appreciated by the pilot of the aircraft.

The tapes 6 and 7 are driven by two servo systems (not shown in FIGURE 1), the tape 6 being driven by one servo system in accordance with the analogue representation of distance travelled S derived by the computing equipment, and the tape 7 being driven by the other in accordance with the analogue representation of increased distance $S_I$. During the ground-run of the aircraft therefore, the index 1 is positioned across the face-plate 3 in accordance with the distance S actually travelled by the aircraft, whereas the index 2 is positioned across the face-plate 3 in accordance with the increased distance $S_I$ which needs to be travelled to attain the increase $v$ in velocity V. The two drives are in the same sense, each being such that the length of the section 8 which is visible provides a measure of the relevant distance. Thus by observing the difference in position of the two indices 1 and 2, as clearly represented by the difference between the visible-lengths of the sections 8 of the two tapes 6 and 7, the pilot readily obtains an indication, related to the distance already travelled, of the extra distance that needs to be travelled to attain the velocity increase $v$. The pilot is thereby provided with an indication of the acceleration performance of the aircraft, and may readily detect when this is sub-normal.

The indicator includes a marker index 10 which is preset (by means not shown) under manual control and before commencement of the ground-run, to a position along the paths of the two tapes 6 and 7 which, with respect to the face-plate 3, corresponds to an estimate of the distance it will be necessary for the aircraft to travel during the ground-run to attain a predetermined velocity. For example the index 10 may be set to a position corresponding to the predetermined distance $S_L$ from the beginning of the ground-run at which the velocity $V_L$ for lift-off is scheduled to be attained. The position of the index 2 relative to the marker index 10 along the path of the tape 7, when taken in conjunction with knowledge of the amount by which the aircraft velocity falls short of said predetermined velocity, provides the pilot with an early indication of whether the said predetermined velocity can be attained in the estimated distance.

Two mutually perpendicular cursors 11 and 12 are provided in the indicator to extend across the display and effectively divide the visible portion of the face-plate 3 into four distinct regions 3A, 3B, 3C, and 3D. The cursors 11 and 12 are driven by two servo systems (not shown in FIGURE 1), the cursor 11 being driven by one servo system in accordance with the analogue representation of the predicted distance $S_V$ derived by the computing equipment, and the cursor 12 being driven by the other in accordance with the analogue representation of the predicted distance $S_H$. Each cursor 11 and 12 extends at forty-five degrees to the tape 6 and is driven to move in either direction normal to its own length so as to intersect the tape 6 at a position corresponding to the relevant predicted distance $S_V$ or $S_H$. By observing the position of the index 1 relative to the cursors 11 and 12 and the movement relative to one another of the index 1 and each cursor 11 and 12, the pilot can assess not only the present situation, but also the likely future situation during the ground-run.

The present situation can be assessed from the position of the index 1 relative to the two cursors 11 and 12. The cursor 11 intersects the tape 6 at a point corresponding to the distance $S_V$ (which is the minimum distance beyond which take-off can be continued safely in the event of failure of an engine), so that if the index 1 has not yet reached this point of intersection (as shown in FIGURE 1) the indication is that take-off cannot be continued safely if an engine fails. The cursor 12 on the other hand intersects the tape 6 at a point corresponding to the distance $S_H$ (which is the distance beyond which take-off cannot be abandoned safely) so that if the index 1 has not yet reached this point (as shown in FIGURE 1) the indication is that take-off can be abandoned with safety. The regions 3A to 3D into which the cursors 11 and 12 divide the display can be regarded as defining four different situations, the particular region which at any one time contains the index 1 indicating which situation is relevant. The situation applicable to the region 3A is that in which it is not safe to continue with take-off if an engine fails, but in which it is safe to abandon take-off, whereas the situation applicable to the region 3B is that in which, like region 3A, it is safe to abandon take-off but in which it is also safe to continue take-off if an engine fails. In the region 3C it is safe to take-off if an engine fails, but take-off cannot be abandoned with safety, whereas in the region 3D it is neither safe to abandon take-off nor to continue if an engine fails.

In general the regions 3A to 3D vary in area as take-off progresses, the boundaries of the regions provided by the cursors 11 and 12 moving in accordance with the variations in the predicted distances $S_V$ and $S_H$. From the movements of these boundaries (11 and 12) in relation to the rate of movement of the index 1 and its direction (defined by the tape 6), the pilot can assess the likely future situation. In particular, the pilot can assess the general trend of the ground-run by observing movement of the intersection point of the two cursors 11 and 12 in relation to the movement of the index 1. This intersection point during a normal take-off moves in a downward direction transverse to the tape 6, the value of the distance $S_V$ increasing and that of $S_H$ decreasing. Thus by assessing whether the intersection point will cross the path of the index 1 ahead or behind the index 1, the pilot can predict whether he is likely to enter the potentially dangerous situation of region 3D. He can also form an impression of the time for which he is likely to remain in any one situation and can take in good time whatever corrective action he regards as necessary.

It will be appreciated that in addition to the information provided by the position and movement of the index 1 relative to the cursors 11 and 12, the pilot will make use of other information (for example regarding the specific nature and circumstances affecting the particular runway being used) when deciding at any point whether to continue take-off. The information provided by the indicator of FIGURE 1 is however in this respect of notable assistance to him in making the decision.

The construction of the computing equipment, and the manner in which it computes the values of the velocity V, the distance travelled S, and the predicted distances $S_I$, $S_V$, and $S_H$ and provides signals representative of these variables for driving the indicator of FIGURE 1, will now be described with reference to FIGURE 2.

Figure 2:
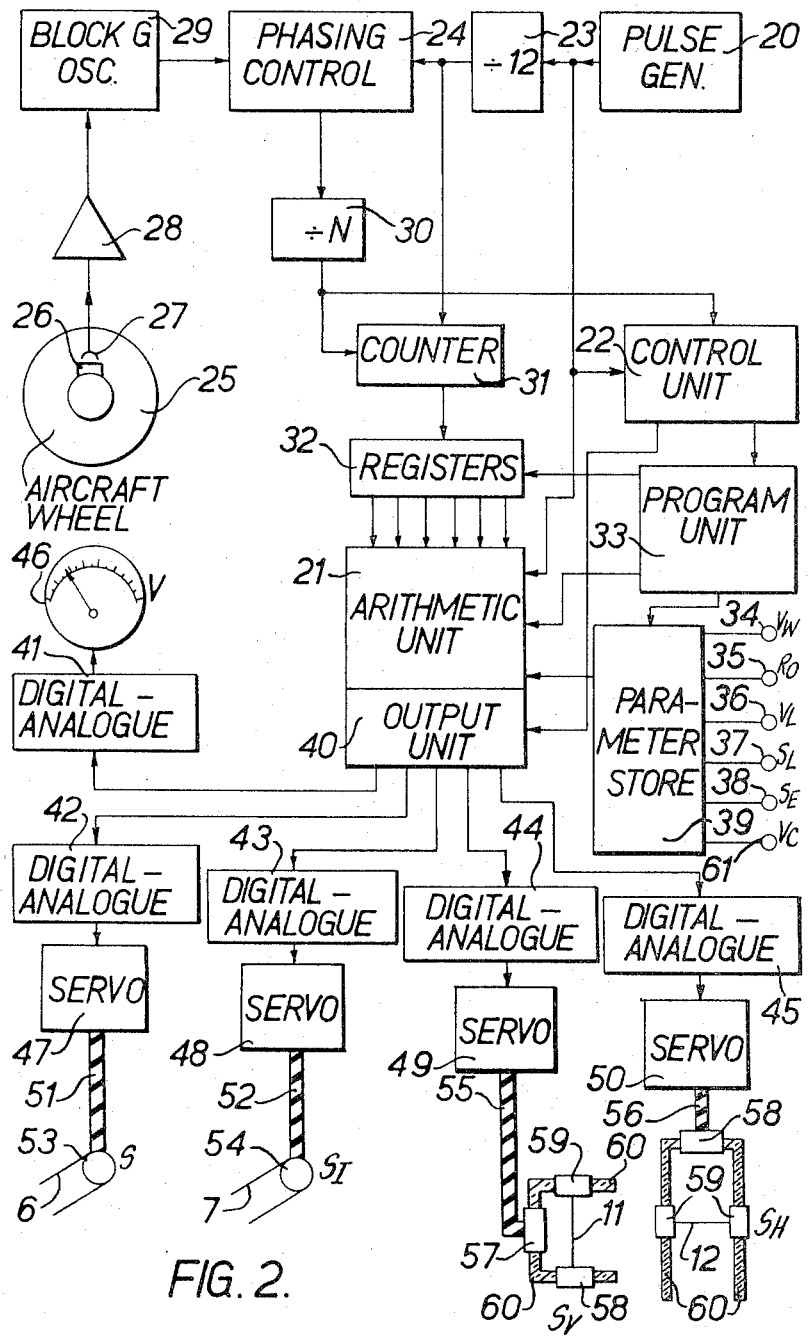
FIGURE 2 is a block schematic representation of computing equipment and associated means of the first instrument.

Referring to FIGURE 2, a crystal-controlled pulse generator 20 generates a pulse train which has a pulse recurrence frequency of one hundred kilocycles per second, and which serves to provide a timing reference for the computing equipment. The pulse train is supplied from the pulse generator 20 to an arithmetic unit 21, to a computer control unit 22, and to a frequency-divider 23. The frequency-divider 23 has a division ratio of 12:1, and the pulse train derived by it is applied as a reference to a phasing-control circuit 24 that receives an input pulse train derived in accordance with rotation of a wheel 25 of the aircraft.

An element 26 of magnetic material is associated with the wheel 25 to rotate therewith and to induce an electric pulse in an inductive pick-off 27 for each revolution. The pulses generated in the pick-off 27 are shaped in an amplifier and trigger circuit 28 and are passed to trigger a blocking oscillator 29 which operates to produce a short, sharp output pulse for each input pulse applied from the circuit 28. The pulses generated by the blocking oscillator 29 are applied to the phasing-control circuit 24 which operates to provide an output pulse for each pulse received from the blocking oscillator 29. Each output pulse from the circuit 24 is positioned substantially midway in time between successive pulses from the frequency divider 23.

The correctly phased output pulses of the circuit 24 are supplied to a frequency-divider 30 which produces one output pulse for every N input pulses (N being an integer greater than one). In each interval of time between two successive pulses from the frequency-divider 30 the aircraft has travelled a predetermined distance C equal to N times the circumference of the wheel 25. The integer N is determined in any particular case to give convenient circuit operating conditions for a given set of aircraft characteristics, and may for example be some small number such as two or four.

The pulses derived by the frequency-divider 30 are applied to a digital counter 31 and also to the control unit 22. The counter 31 counts the pulses derived by the frequency-divider 23, and each pulse supplied by the frequency-divider 30 is effective to transfer the count of the counter 31 to a first of a chain of six registers 32, and also to reset the counter 31 to zero. Each pulse from the frequency-divider 30 supplied to the control unit 22 is effective to control by way of a program unit 33 transfer of the count stored in the first register to the second of the six registers 32, and to transfer the count stored in the second register to the third, and so on along the chain of six registers 32. In this manner the six registers 32 store the last six counts of the counter 31, each count representing the number of pulses which appear at the output of the frequency-divider 23 between successive pulses generated by the frequency-divider 30. The values of the counts stored in the six registers 32 are communicated to the arithmetic unit 21 to enable the unit 21 to compute therefrom appropriate values of the velocity V and acceleration $a$ of the aircraft. Values of velocity and acceleration may be computed, using difference formulae, from a minimum of three count values, but it is preferred to use a larger number of count values, namely six in the present embodiment, in order to achieve satisfactory smoothing of the computation.

The arithmetic unit 21 receives via the program unit 33 the pulses which are supplied to the control unit 22 from the frequency-divider 30. These pulses are counted in the arithmetic unit 21 to compute a value for the distance travelled S. Five manually-operable controls 34 to 38 are coupled to a parameter store 39, and are used to set in the unit 39 appropriate values for wind speed $V_W$, effective rolling radius $R_o$ of the wheel 25, scheduled lift-off velocity $V_L$, scheduled lift-off distance $S_L$, and available runway distance $S_E$, all of which values are used in the computation performed by the unit 21.

The values of velocity V, distance travelled S, and predicted distances $S_I$, $C_V$, and $S_H$ computed by the arithmetic unit 21 are conveyed in rapid sequence to an output unit 40. Under control of the control unit 22 the output unit 40 supplies to a digital-to-analogue converter 41 a digital signal representative of the computed velocity V, and supplies to a digital-to-analogue converter 42 a signal representative of the computed distance travelled S. In addition the output unit 40 supplies to digital-to-analogue converters 43 to 45 digital signals representative of the computed value of distances $S_I$, $S_V$, and $S_H$. The converters 41 to 45 provide electrical analogue representations of the digital signals they receive from the unit 40, the analogue representation provided by the converter 41 being supplied to a velocity indicator 46 so as to provide a visual indication of the computed value of velocity V. The analogue representations provided by the converters 42 to 45 are supplied to servo systems 47 to 50, the servo system 47 rotating a shaft 51 to a position dependent upon the represented value of the distance travelled S and the servo 48 rotating a shaft 52 to a position representative of the value of predicted increased distance $S_I$. The tapes 6 and 7 are wound on drums 53 and 54 that are coupled to the shafts 51 and 52 respectively, so that the tapes 6 and 7 are positioned in accordance with the distance S and predicted increased distance $S_I$, as required.

The servo systems 49 and 50 rotate shafts 55 and 56 to positions dependents upon the represented values of distances $S_V$ and $S_H$ respectively. The shaft 55 drives gearing 57 that controls the horizontal movement of the cursor 11, and the shaft 56 drives gearing 58 that controls the vertical movement of the cursor 12. Each cursor 11 and 12 extends between internally-threaded bushes 59 that are screwed on two threaded shafts 60 driven by the relevant gearing 57 or 58. Each bush 59 is restrained from rotation, and the two shafts 60 are driven in the senses required for lateral movement of the relevant cursor 11 or 12.

The gearings 57 and 58 both introduce reduction factors of 0.707 into the drives to the cursors 11 and 12. This reduction ensures that the representations of the distances S, $S_I$, $S_V$, and $S_H$ computed by the computing equipment are all to the same scale lengthwise of the tapes 6 and 7.

The valves of the velocity V, the distance S, and the distances $S_I$, $S_V$ and $S_H$, are computed by the arithmetic unit 21 under the control of the control unit 22 acting via the program unit 33. The program unit 33 stores a permanent program which is repeated for each fresh calculation of the predicted distances $S_I$, $S_V$, and $S_H$. The control unit 22 also acts to switch the result of each computation performed in the arithmetic unit 21 into an appropriate one of five registers (not shown) in the output unit 40, these five registers supplying digital representations of these results to the five digital-to-analogue converters 41 to 45 respectively.

The computations performed in the arithmetic unit 21 use the fact that each pulse supplied by the frequency-divider 30 indicates that the aircraft has travelled a further incremental distance C equal to $2\pi NR_o$, and that a measure of the time taken to travel this distance is given by the pulse count $P_n$, say, which as a result of the pulse is transferred from the counter 31 into the first register of the six registers 32. The five pulse counts $P_{n-1}, P_{n-2}, \ldots,$ and $P_{n-5}$ for the previous five increments C are at the same time transferred along the chain of registers 32 to occupy the second to sixth registers respectively. Thus it is the six values $P_{n-5}$ to $P_n$ representing the times taken by the aircraft to cover the last six increments C (which give successive values $S_{n-5}, S_{n-4}, \ldots,$ and $S_n$ of the distance travelled S) that are communicated to arithmetic unit 21. Using these values the arithmetic unit 21 computes the velocity value $V_{n-3}$, and the acceleration value $a_{n-3}$ which applied at the instant when the pulse count $P_{n-3}$ was transferred into the first of the registers 32, the computations being performed according to the following formulae:

$$V_{n-3} = 3FC[P_x^2 + P_y^2] / [P_x P_y (P_x + P_y)]$$
$$a_{n-3} = 6F^2C[P_x - P_y] / [P_x P_y (P_x + P_y)]$$

where
F is the pulse repetition frequency of the pulse train supplied by the frequency-divider 23 to the counter 31,
$P_x$ is the sum $(P_{n-5} + P_{n-4} + P_{n-3})$, and
$P_y$ is the sum $(P_{n-2} + P_{n-1} + P_n)$ Since the values of velocity V and acceleration $a$ as computed relate to the end of the fourth previous interval, the value of distance travelled S used is the value $S_{n-3}$. The value $S_{n-3}$ is equal to $(n-3)C$ and the value of $n$ required for the computation of this in the arithmetic unit 21 is provided by the count which, as previously mentioned, is made of the pulses from the frequency-divider 30.

The value of the predicted increased distance $S_I$ is computed in the artithmetic unit 21 using Equation 2 involving the computed values of $S_{n-3}$, $V_{n-3}$, and $a_{n-3}$, the constant value $v$, and the modifying function H. The modifying function H is an approximation to the ideal modifying function $h$, and is required because the acceleration of the aircraft varies with the velocity V. The function H is given by:

$$H = \{V_C^2 + [V_C - V][V(b+c) + V_C(b'+c')]\} / V_C^2$$

where
$V_C$ is the scheduled critical velocity,
$b$ and $b'$ are constants having values dependent upon the scheduled critical velocity $V_C$, and
$c$ and $c'$ are constants having values dependent upon the wind velocity $V_W$.

The value of the scheduled critical velocity $V_C$ is conveyed to the parameter store 39 by means of a manually-adjustable control 61, and the values of the constants $b$, $b'$, $c$, and $c'$ are derived in the parameter store 39 in accordance with the settings of the control 61 and 34.

The value of the predicted distance $S_V$ is computed in the arithmetic unit 21 using Equation 3 involving the computed values of $S_{n-3}$, $V_{n-3}$, and $a_{n-3}$, a value of $p$ computed in accordance with the value of $V_{n-3}$, the constant values of $S_L$ and $V_L$ set by the controls 37 and 36, and the modifying function H. Furthermore, the value of the predicted distance $S_H$ is computed in the arithmetic unit 21 using Equation 4 involving the constant value of $S_E$ set by the control 38 and a value of $S_B$ computed in accordance with the value of $V_{n-3}$.

In general, an aircraft may have characteristics which would permit the pilot greater freedom of choice than that implied by the two cursors 11 and 12. For example, if the take-off run is being made at less than full throttle a continued take-off after engine failure at a certain point may not be possible on partial throttle, but opening to full throttle, or even the selection of afterburning in the case of a jet-engined aircraft, could make it possible to continue the take-off safely. Similarly, the pilot may want to know whether he can stop the aircraft using brakes alone, brakes together with reverse thrust, or whether he has to resort to use of an arrester barrier, if one is available, at the end of the runway. Provision of relevant information in any of these situations could be made by the use of additional cursors.

The datum, or "zero," point of the instrument described above corresponds to zero distance travelled, the index 1 being only just visible at the edge of the aperture 4 when the aircraft is at the beginning of the ground-run. In certain circumstances, however, it is unnecessary to display the ground-run through its initial stages and in these circumstances the datum point may be made to correspond to an appropriate datum distance $S_D$ along the ground-run. This may be achieved simply by subtracting the value $S_D$ from the values of $S$, $S_I$, $S_V$ and $S_H$ computed in the computing equipment.

Although in the aircraft instrument which is described above with reference to FIGURES 1 and 2, a measure of the aircraft velocity V is derived from signals received from a pick-off responsive to rotation of a wheel of the aircraft, this is not necessarily the case. Instead the velocity may be derived from signals received from an inertial system on a sonic Doppler system in the aircraft. Furthermore, an indication of the difference between the scheduled critical velocity (related to the condition expected at the distance represented in the display by the marker index 10) and the aircraft velocity may be usefully included in the display provided by the indicator. This additional indication may be provided for example by means of a cyclometer type of presentation between the tape 6 and the cursor 12 to the left-hand side (as shown in the drawing) of the face-plate 3, it being clear from the description in the patent specification referred to earlier that a signal for driving such a presentation can be readily obtained from the computing equipment. Where this additional indication is provided, reference to the position of the index 2 relative to the marker index 10 provides the pilot with further information regarding aircraft performance. If the index 2, which predicts the distance required to achieve an increase $v$ in velocity V, has reached the marker index 10 when the indicated difference between the critical velocity and the aircraft velocity stands at more than $v$, then clearly performance of the aircraft is deficient.

With the instrument described with reference to FIGURES 1 and 2 the value of the velocity increase $v$ is a constant, but this is not necessarily so. The value of the increase $v$ can be made equal to the difference between the critical velocity $V_C$ and the actual velocity V, the index 2 being positioned in accordance with the distance given by:

$$S + H(V_C^2 - V^2) / 2a$$

In these latter circumstances the position of the index 2 provides a long-term prediction of the distance which needs to be travelled to attain the critical velocity $V_C$.

Where with the form of indicator shown in FIGURE 1 the pilot can readily assess a future distance situation from the pattern and rate of movement of the index 1 and cursors 11 and 12 alone, the prediction facility provided by the indices 2 and 10 may be omitted. In these circumstances the instrument may be modified so that the separate movements of the cursors 11 and 12 are combined with that of the index 1, the resulting display having a single index that moves in relation to fixed lines rather than moving cursors. The indicator of an instrument modified in this manner is shown in FIGURE 3 and will now be described.

Figure 3:
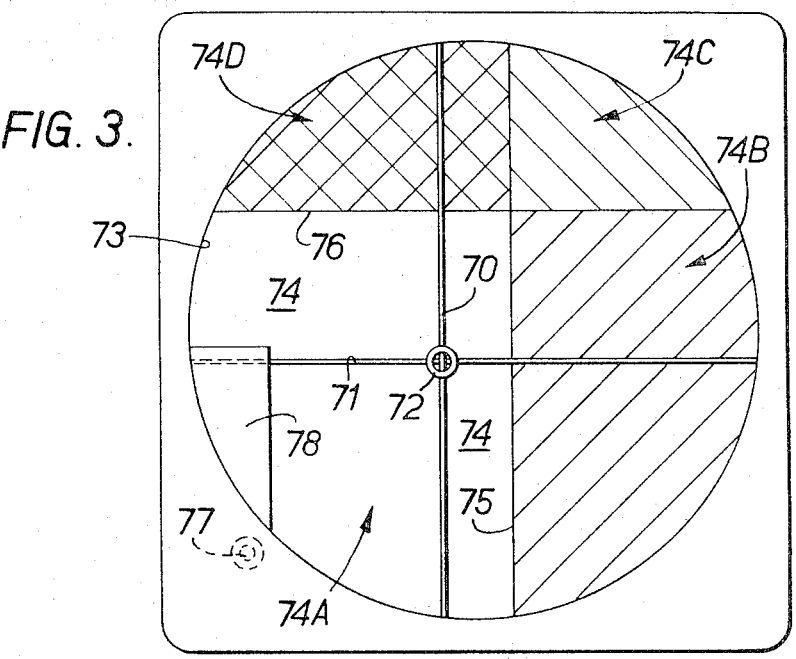
FIGURE 3 is a front elevation of an indicator forming part of the second aircraft instrument.

Referring to FIGURE 3, two mutually perpendicular wires 70 and 71 together carry an annular index 72. The wire 70 is threaded through a first bore that passes diammetrically through the index 72, and the wire 71 is threaded through a second bore that passes diammetrically through the index 72 perpendicular to the first bore, the two bores being spaced one behind the other so that there is no actual contact between the wires 70 and 71 where they cross one another.

The wires 70 and 71 within the viewing aperture 73 of the indicator extend across a face-plate 74 that is divided into four regions 74A to 74D by mutually perpendicular lines 75 and 76. The regions 74A to 74D are of different colors so as to be readily distinguishable from one another in the display, and the index 72 is of yet another color so as to be readily identifiable against the background of any region 74A to 74D. It is the position and movement of the index 72 relative to the lines 75 and 76 that is of significance in the present indicator, the wires 70 and 71 merely carrying the index 72 and applying to it components of movement parallel to the lines 75 and 76 respectively.

The index 72 slides easily along either wire 70 and 71, and components of movement parallel to the line 75 are applied to it by transverse movement of the wire 71 whereas components of movement parallel to the line 76 are applied to it by transverse movement of the wire 70. Transverse movements are applied to the wires 70 and 71 by shaft-controlled screw mechanisms corresponding to those (57 to 60) which provide transverse movements to the cursors 11 and 12 in the instrument described above with reference to FIGURES 1 and 2. The shafts controlling these mechanisms are driven by servo systems under the control of computing equipment similar to that shown in FIGURE 2.

The computing equipment in the present case, instead of providing output signals representative of $S_I$, $S_V$, and $S_H$ provides output signals representative of two variables X and Y given by:

$$X = S_V - S \quad (5)$$
$$Y = S_H - S \quad (6)$$

The values of the two variables X and Y are computed in the arithmetic unit of the computing equipment, using the values of S, $S_V$ and $S_H$ all of which are computed in the same manner as described above in connection with the computing equipment of FIGURE 2.

The shaft of the mechanism that controls the wire 70 is positioned in accordance with the computed value of the variable X, whereas the shaft of the mechanism that controls the wire 71 is positioned in accordance with the computed value of the variable Y. The drives to the two wires 70 and 71 are applied so that the wire 70 is spaced from the line 75 by a distance proportional to the value of X, and that the wire 71 is spaced from the line 76 by a distance proportional to the value of Y, the same constants of proportionality being used in the two cases. The senses of the two drives are such that during a normal ground-run the index 72 moves from a datum position 77 (out of view) across the face-plate 74 towards the two lines 75 and 76 eventually to cross from the region 74A into one or more of the regions 74B, 74C, and 74D.

The fixed regions 74A to 74D correspond to the movable regions 3A to 3D respectively of the indicator of FIGURE 1, so that the pilot can assess from the position of the index 72 and its rate and direction of movement the present situation and the likely future situation.

The indicator shown in FIGURE 3 is arranged so that only the later stages of the ground-run are displayed. The values of X and Y computed and applied to the indicator in these circumstances require to be limited to maximum values of X' and Y' respectively, and accordingly limits are imposed on the horizontal and vertical displacements of the index 72, the datum point 77 being the point where both limits X' and Y' apply. During any take-off run it may be that the value of one of the variables X and Y will become less than its limit before the other, so that the index 72 will then move initially either vertically or horizontally from the position 77. If the value of the variable Y becomes less than the limit Y' before the variable X becomes less than the limit X', the index 72 will initially move vertically upwards from the position 77 along the wire 70 towards the line 76. Although such initial movement can be consistent with a potentially safe take-off the pilot may predict from it that continuation of the take-off is likely to lead to the potentially dangerous situation represented by the region 74D where take-off cannot be abandoned safely and in the event of failure of an engine cannot be continued safely. In order to avoid the take-off being abandoned unnecessarily in such circumstances there is provided a mask 78 that obscures initial movements of the index 72 which may cause alarm but which are nevertheless consistent with potentially safe take-off.

I claim:

1. An aircraft instrument for use in monitoring the ground-run of take-off of an aircraft in relation to a plurality of distinct situations concerning safety that are each potentially applicable to the aircraft during take-off, comprising means responsive to movement of the aircraft during the ground-run to provide signals which are dependent upon distance traveled and forward velocity of the aircraft, and an indicator responsive to said signals to provide a two-dimensional display indicating which of said situations currently applies to the aircraft, said indicator including means for dividing the display into a plurality of distinct regions representative respectively of the said situations potentially applicable to the aircraft, means providing an index lying selectively in one or other of said regions of the display to indicate the said situation currently applicable to the aircraft, the particular region in which the index lies being dependent upon the position relative to one another of the display-dividing means and the index within the two dimensions of the display, and drive means responsive to said signals for varying the said relative position of the display-dividing means and the index in said two dimensions, said drive means including means for providing movement relative to one another of the said display-dividing means and the said index (provides an indication of the likely future situation) in direction and rate dependent upon said signals.

2. An aircraft instrument according to claim 1 wherein said index is mounted for movement along a predetermined path from a stationary datum position in the display, and the said drive means for varying the relative position of the display-dividing means and the index comprises means for displacing the index from said datum position along said path by an amount dependent upon the distance travelled by the aircraft.

3. An aircraft instrument according to claim 2 wherein said index is carried by a tape that extends across the display.

4. An aircraft instrument according to claim 2 wherein the display-dividing means comprises a movable cursor that extends across the display to intersect said path.

5. An aircraft instrument according to claim 4 wherein said cursor is mounted for movement transversely of its length, transverse movement of the cursor varying its point of intersection with said path of the index.

6. An aircraft instrument according to claim 5 including computing equipment for computing in accordance with the distance travelled and the forward velocity of the aircraft a value for the minimum distance that needs to have been travelled by the aircraft in the ground-run before take-off can be continued safely in the event of the occurrence of a predetermined emergency, and means for moving said cursor transversely to a position in the display dependent upon the value computed such that said point of intersection is spaced along said path from said datum position by an amount dependent upon the computed value.

7. An aircraft instrument according to claim 5 including computing equipment for computing in accordance with the forward velocity of the aircraft the maximum value of distance travelled for which take-off can be abandoned with safety, and means for moving said cursor transversely to a position in the display dependent upon the value computed such that said point of intersection is spaced along said path from said datum position by an amount dependent upon the computed value.

8. An aircraft instrument according to claim 2 wherein the display-dividing means comprises two mutually-inclined and movable cursors each of which extends across the display to intersect said path of the index.

9. An aircraft instrument according to claim 8 wherein each cursor is mounted for movement transversely of its length, transverse movement of the cursor varying its point of intersection with said path of the index.

10. An aircraft instrument according to claim 9 including computing equipment for performing at least two computations in accordance with the distance travelled and the forward velocity of the aircraft a value for the minimum distance that needs to have been travelled by the aircraft in the ground-run before take-off can be continued safely in the event of the occurrence of a predetermined emergency, and the second of which is for computing in accordance with the forward velocity of the aircraft the maximum value of distance travelled for which take-off can be abandoned with safety, and means for moving the two cursors transversely to positions in the display dependent respectively upon the two values computed such that the points of intersection of the two cursors with said path are spaced along the path from said datum position by amounts dependent respectively upon the two computed values.

11. An aircraft instrument according to claim 1 including computing equipment for computing a prediction of the distance that the aircraft will need to travel during the ground-run in order to achieve a predetermined increment in its forward velocity, and wherein the said indicator includes a further index that is movable along a predetermined path extending beside and substantially parallel to the path of the first-mentioned index, and means for displacing said further index along its path of movement by an amount dependent upon the predicted distance computed by said computing means.

12. An aircraft instrument according to claim 1 wherein said display-dividing means is stationary within the display, and the said drive means for varying the relative position of the display-dividing means and said index comprises means for moving said index relative to said display-dividing means in a direction dependent upon said signals.

13. An aircraft instrument according to claim 12 wherein the said indicator includes a viewing aperture, a face-plate viewable through said aperture, said regions being different regions of said face-plate visible through the viewing aperture, and means mounting said index for movement in any direction across said face-plate.

14. An aircraft instrument according to claim 13 wherein two elongated and mutually perpendicular elements extend lengthwise across said face-plate to cross one another in the display, each said element being mounted for movement transversely of its length relative to said face-plate, and said index comprises a member carried by said two elements at the point where they cross one another.

15. An aircraft instrument according to claim 13 wherein the said drive means for varying the relative position of the display-dividing means and said index comprises means for positioning said index across the face-plate in accordance with distance travelled by the aircraft.

16. An aircraft instrument according to claim 15 wherein the display-dividing means includes at least one line extending across the face-plate.

17. An aircraft instrument according to claim 16 including computing equipment for computing in accordance with the distance travelled and the forward velocity of the aircraft a value for the amount by which the distance travelled differs from a minimum value of the distance that needs to have been travelled by the aircraft in the ground-run before take-off can be continued safely in the event of the occurrence of a predetermined emergency, and wherein the said drive means for varying the relative position of the display-dividing means and said index comprises means for positioning said index with a spacing from said one line dependent upon the computed value.

18. An aircraft instrument according to claim 16 including computing equipment for computing in accordance with the distance travelled and the forward velocity of the aircraft a value for the amount by which the distance travelled differs from the maximum value for which take-off can be abandoned with safety, and wherein the said drive means for varying the relative position of the display-dividing means and said index comprises means for positioning said index with a spacing from said one line dependent upon the computed value.

19. An aircraft instrument according to claim 15 wherein the display-dividing means comprises two mutually perpendicular and intersecting lines on the face-plate.

20. An aircraft instrument according to claim 19 including computing equipment for performing two computations in accordance with the distance travelled and the forward velocity of the aircraft, a first of the computations computing a value for the amount by which the distance travelled differs from a minimum value of the distance that needs to have been travelled by the aircraft in the ground-run before take-off can be continued safely in the event of the occurrence of a predetermined emergency, and the second computation computing a value for the amount by which the distance travelled differs from the maximum value for which take-off can be abandoned with safety, and wherein the said drive means for varying the relative position of the display-dividing means and said index comprises means for positioning said index with a spacing from one of said two lines dependent upon a first of the computed values and with a spacing from the other of said two lines dependent upon the second computed value.

21. An aircraft instrument for use during the ground-run phase of take-off of an aircraft, comprising means for providing a first signal dependent upon the distance traveled along the ground by the aircraft, computing means for providing a second signal dependent upon a computed prediction of the distance that the aircraft will need to travel during the ground-run in order to achieve a predetermined constant increment in its velocity, said computing means up-dating said prediction with variation in the velocity of the aircraft through the ground-run, and an indicator including first and second indices that are movable with respect to one another along substantially parallel paths, means responsive to said first signal to position said first index along its respective path of movement in accordance with the said distance traveled, and means responsive to said second signal to position said second index along its respective path of movement in accordance with said prediction of the distance which needs to be travelled.

References Cited

UNITED STATES PATENTS

| | | | |
|---|---|---|---|
| 2,932,024 | 4/1960 | Sant Angelo | 73—178 X |
| 3,077,110 | 2/1963 | Gold | 235—150.22 X |
| 3,111,577 | 11/1963 | De Graffenried et al. | 235—150.22 |
| 3,116,638 | 1/1964 | Brahm | 340—27 X |
| 3,128,445 | 4/1964 | Hosford | 244—76 |
| 3,159,738 | 12/1964 | James et al. | 235—150.22 X |

FOREIGN PATENTS

| | | |
|---|---|---|
| 921,216 | 3/1963 | Great Britain. |
| 932,190 | 7/1963 | Great Britain. |

OTHER REFERENCES

Fusca, James A., "Takeoff Monitor Computes Runway Roll," Aviation Week, Oct. 13, 1958, pp. 99–105.

MALCOLM A. MORRISON, *Primary Examiner.*

T. J. PAINTER, *Assistant Examiner.*